US008327641B2

(12) United States Patent
Freund et al.

(10) Patent No.: US 8,327,641 B2
(45) Date of Patent: Dec. 11, 2012

(54) SYSTEM FOR GENERATION OF POWER USING SOLAR ENERGY

(75) Inventors: Sebastian Walter Freund, Unterföhring (DE); Kevin Richard Lang, Denver, CO (US); Pepe Palafox, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 98 days.

(21) Appl. No.: 12/628,419

(22) Filed: Dec. 1, 2009

(65) Prior Publication Data

US 2011/0127773 A1 Jun. 2, 2011

(51) Int. Cl.
*B60K 16/00* (2006.01)

(52) U.S. Cl. ........................................ 60/641.8

(58) Field of Classification Search ............... 60/39.182, 60/641.8, 39.5, 39.511, 641.14, 698, 641.11–641.15; 290/1 R, 52, 40 C See application file for complete search history.

(56) References Cited

U.S. PATENT DOCUMENTS

| | | | | |
|---|---|---|---|---|
| 4,167,856 | A | 9/1979 | Seidel et al. | |
| 4,189,922 | A | 2/1980 | Bellofatto | |
| 4,259,836 | A | 4/1981 | Finckh | |
| 4,262,484 | A | 4/1981 | Jubb et al. | |
| 4,942,736 | A | 7/1990 | Bronicki | |
| 5,417,052 | A | 5/1995 | Bharathan et al. | |
| 5,444,972 | A | 8/1995 | Moore | |
| 5,513,488 | A * | 5/1996 | Fan | 60/775 |
| 5,727,379 | A | 3/1998 | Cohn | |
| 6,141,949 | A | 11/2000 | Steinmann | |
| 6,237,337 | B1 | 5/2001 | Bronicki et al. | |
| 6,694,738 | B2 * | 2/2004 | Bronicki et al. | 60/641.8 |
| 6,742,336 | B2 * | 6/2004 | Itou et al. | 60/646 |
| 2006/0260314 | A1 | 11/2006 | Kincaid et al. | |
| 2008/0127647 | A1 * | 6/2008 | Leitner | 60/645 |

FOREIGN PATENT DOCUMENTS

| | | | |
|---|---|---|---|
| EP | 1930587 | A2 | 6/2008 |
| GB | 2449181 | A | 11/2008 |

* cited by examiner

*Primary Examiner* — Ehud Gartenberg
*Assistant Examiner* — Vikansha Dwivedi
(74) *Attorney, Agent, or Firm* — Scott J. Asmus

(57) ABSTRACT

An electricity generation system is presented. The electricity generation system includes a solar preheater for preheating compressed discharge air, a combustor to receive the heated compressed air from the solar preheater, burn a fuel using the heated compressed air to generate hot burned gas, a first turbine to receive the hot burned gas from the combustor, expand the hot burned gas to generate exhaust gas, a heat recovery steam generator to receive the exhaust gas from the first turbine, generate vapor by heating a condensed fluid using the exhaust gas, a solar evaporator/superheater to receive a heated working fluid from the heat recovery steam generator, generate solar vapor by heating the heated working fluid, and a second turbine to drive a second generator using vapor and the solar vapor.

17 Claims, 3 Drawing Sheets

SYSTEM FOR GENERATION OF POWER USING SOLAR ENERGY

BACKGROUND

Generation of electricity is typically a process using other forms of energy and is often generated at a power station by electromechanical generators that are usually driven by heat engines. The heat engines may be fueled by chemical combustion, nuclear fission, or by other means, such as, kinetic energy of flowing water, wind, and the like. Further, solar power may also be used to drive a heat engine for generation of electricity.

Electricity generation techniques using heat engines generally combust fossil fuel to generate electricity. However, usage of fossil fuel for the generation of electricity is dominated by the high cost of the fossil fuel and the depletion of natural resources, which in turn results in a high cost of electricity. In contrast, usage of solar energy for the generation of electricity uses a renewable energy source but is dominated by high costs associated with building a plant.

It is therefore desirable to develop a design of a power plant that is configured to generate electricity using solar energy, fuel, and/or both. Particularly, there is a need for a power plant that may run entirely or partially on solar energy when fuel prices are high, and run entirely or partially on fuel when enough solar energy is not available. Further, there is a need for a power plant that achieves high efficiency while generating electricity to reduce overall cost of generation of electricity.

BRIEF DESCRIPTION

The system relates generally to generation of power, and more particularly to a system for generation of power using solar energy.

Briefly in accordance with one aspect of the technique, an electricity generation system is presented. The electricity generation system includes a solar preheater for preheating compressed discharge air using a first portion of a heated solar fluid to generate heated compressed air, a combustor operatively coupled to the solar preheater to receive the heated compressed air from the solar preheater, burn a fuel using the heated compressed air to generate hot burned gas, a first turbine operatively coupled to the combustor to receive the hot burned gas from the combustor, expand the hot burned gas to generate exhaust gas, a heat recovery steam generator operatively coupled to the first turbine to receive the exhaust gas from the first turbine, generate vapor by heating a condensed fluid using the exhaust gas, a solar evaporator/superheater operationally coupled to the heat recovery steam generator to receive a heated working fluid from the heat recovery steam generator, generate solar vapor by heating the heated working fluid using a second portion of the heated solar fluid; and a second turbine configured to drive a second generator using vapor received from the heat recovery steam generator and the solar vapor received from the solar evaporator/superheater.

In accordance with another aspect of the present technique, an electricity generation system is presented. The electricity generation system includes a solar preheater for preheating compressed discharge air using a first portion of a heated solar fluid to generate heated compressed air, a combustor operatively coupled to the solar preheater to receive the heated compressed air from the solar preheater, burn a fuel using the heated compressed air to generate hot burned gas, a high pressure turbine operatively coupled to the combustor to receive the hot burned gas from the combustor, expand the hot burned gas to generate a first expanded gas, a reheater operatively coupled to the high pressure turbine to receive the first expanded gas from the high pressure turbine, combust a fuel using the first expanded gas to generate a first heated expanded gas, a low pressure turbine operatively coupled to the high pressure turbine and the reheater to expand the first heated expanded gas received from the reheater to generate the exhaust gas, a heat recovery steam generator connected to the low pressure turbine to generate vapor by heating a condensed fluid with the exhaust gas received from the low pressure turbine, and a solar evaporator/superheater operationally coupled to the heat recovery steam generator to receive a heated working fluid from the heat recovery steam generator, generate solar vapor by heating the heated working fluid using a second portion of the heated solar fluid, and a second turbine to drive a second generator using the vapor received from the heat recovery steam generator and the solar vapor received from the solar evaporator/superheater.

In accordance with still another aspect of the present technique, an electricity generation method is presented. The electricity generation method includes generating heated compressed air by preheating compressed discharge air using a first portion of a heated solar fluid; generating a hot burned gas by combusting a fuel using the heated compressed air, generating a first expanded gas by expanding the hot burned gas in a high pressure turbine, generating a first heated expanded gas by combusting a fuel using the first expanded gas, generating an exhaust gas by expanding the first heated expanded gas, generating vapor and a heated working fluid by heating a condensed fluid utilizing the exhaust gas, generating solar vapor by heating and evaporating the heated working fluid using a second portion of the heated solar fluid, and driving a second turbine to generate electricity using the vapor and the solar vapor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
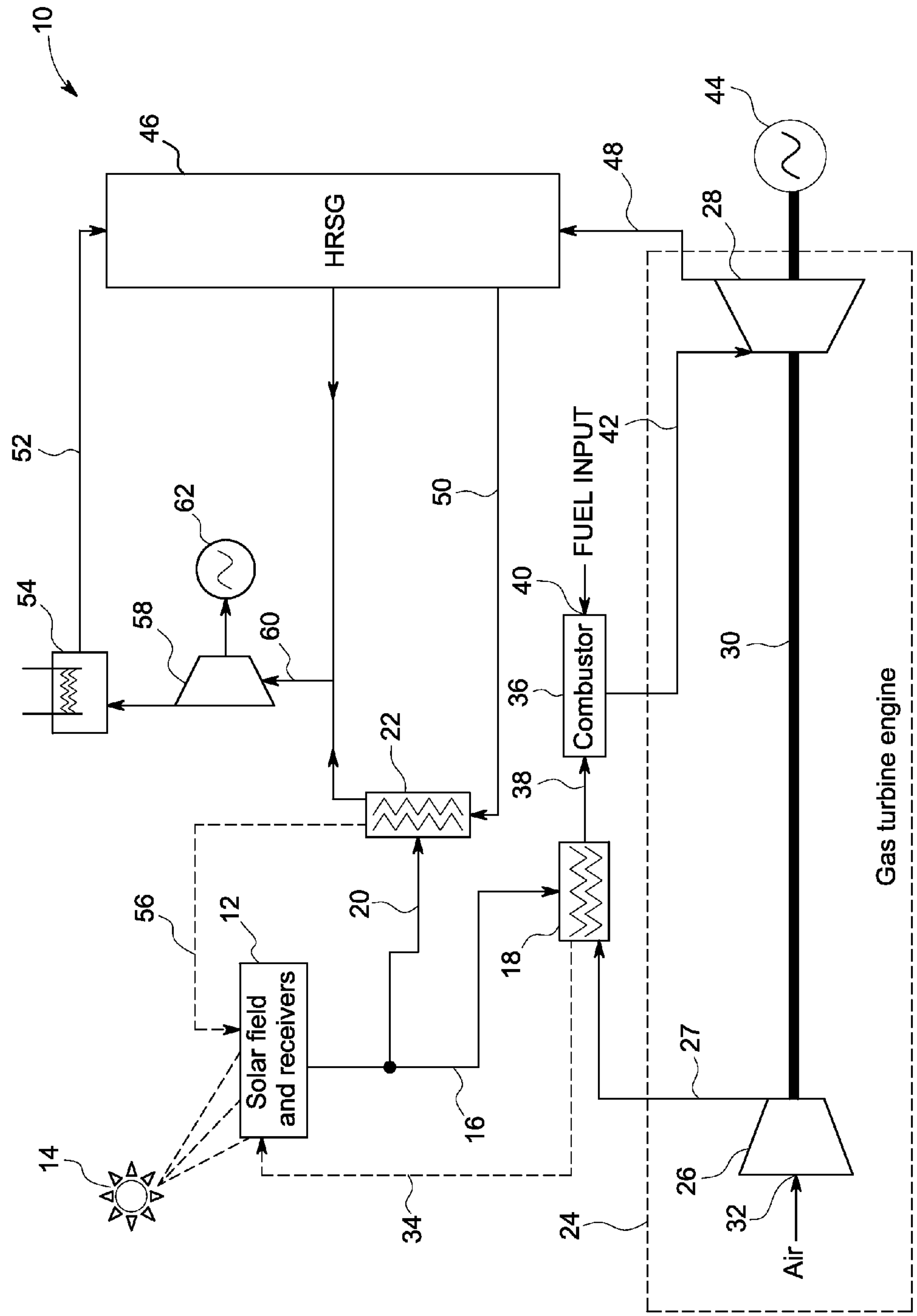
FIG. 1 is a diagrammatical view of one embodiment of an electricity generation system, in accordance with aspects of the present technique.

FIG. 1 is a diagrammatical view of one embodiment of an electricity generation system 10, in accordance with aspects of the present technique. More particularly, FIG. 1 illustrates the electricity generation system 10 for generation of electricity that uses a hybrid-combined cycle with solar preheating. As illustrated in FIG. 1, the electricity generation system 10 may include solar field and receivers 12 for concentrating sunrays from the sun 14 and absorbing heat of the sunrays. An exemplary solar field and receivers for concentrating sunrays will be described in greater detail with reference to FIG. 2. The solar field and receivers 12, for example, may include a reflecting parabolic dish with an absorbing receiver in the focal point, a parabolic trough with an absorber tube in the focal line, an array of mirrors known as heliostats that reflect sunrays onto a central receiver, linear Fresnel lenses or mirrors to focus the sunrays.

Furthermore, in one embodiment, the solar field and receivers 12 may absorb the heat of the sunrays using a solar fluid. As used herein, the term "solar fluid" may be used to refer to a fluid that absorbs heat of the sunrays. The solar fluid, for example, may include a molten salt, a molten metal, an eutectic metal alloy, such as, Galinstan (68.5% Ga, 21.5% In, 10% Sn), a thermal oil, water, steam, or pressurized air. The absorption of heat by the solar fluid may lead to an increase in a temperature of the solar fluid. Consequent to the increase in temperature of the solar fluid, heated solar fluid may be generated. In an exemplary embodiment, the temperature of the heated solar fluid may be in a range from about 300° C. to about 1000° C.

In addition, the system 10 may include a turbine engine 24. The turbine engine 24, for example, may include a compressor 26 that is operationally coupled to a first turbine 28 via a shaft 30. The compressor 26 may facilitate generation of compressed discharge air by compressing air received from an inlet 32. The compression of the air increases the temperature of the compressed discharge air with respect to the temperature of the air received from the inlet 32. The increase in temperature of the air is dependent upon compression ratio and construction of the compressor 26. In certain embodiments, the temperature of the compressed discharge air may be in a range from about 300° C. to about 500° C. The compressed discharge air may then be transferred to a solar preheater 18 via line 27. The solar preheater 18 may also receive a first portion of the heated solar fluid from the solar field and receivers 12 via line 16. As used herein, the term "solar preheater" may be used to refer to a heat exchanger that may be used to transfer heat of a first portion of the heated solar fluid to the compressed discharge air. Further, a second portion of the heated solar fluid from the solar field and receivers 12 may be transferred to a solar evaporator/superheater 22 via line 20.

Furthermore, the compressed discharge air may be heated by the solar preheater 18. In one embodiment, the solar preheater 18 may heat the compressed discharge air by transferring the heat of the first portion of the heated solar fluid to the compressed discharge air. The heating of the compressed discharge air results in generation of heated compressed air. The temperature of the heated compressed air may be in a range from about 700° C. to about 1000° C. Further, the transfer of the heat of the first portion of the heated solar fluid to the compressed discharge air decreases the temperature of the first portion of the heated solar fluid. This decrease in the temperature of the first portion of the heated solar fluid in the solar preheater 18 may generate a cooled solar fluid. As depicted by FIG. 1, the cooled solar fluid may then be transferred back to the solar field and receivers 12 via line 34. The cooled solar fluid may then be pumped through the solar field and receivers 12 to absorb heat of the sunrays, thereby generating the heated solar fluid.

Moreover, the system 10 may include a combustor 36 that may be operationally coupled to the solar preheater 18. In one embodiment, subsequent to the generation of the heated compressed air, the heated compressed air may be transferred from the solar preheater 18 to the combustor 36 via line 38. In one embodiment, the combustor 36 may combust a fuel received from an inlet 40. The combustor 36, for example, may combust the fuel using the heated compressed air received from the solar preheater 18. In one embodiment, the combustion of the fuel using the heated compressed air leads to generation of hot burned gas. In certain embodiments, the temperature of the hot burned gas may be in a range from about 1200° C. to about 1500° C.

Furthermore, the hot burned gas may be transferred to the first turbine 28 in the turbine engine 24 via line 42. The first turbine 28, for example, may be a gas turbine. Additionally, in one embodiment, the first turbine 28 may be a high pressure turbine, a low pressure turbine, or an intermediate pressure turbine. In another embodiment, the first turbine 28 may include one or more combinations of the low pressure turbine, the intermediate pressure turbine and the high pressure turbine that may be mounted on the shaft 30. The hot burned gas may expand in the first turbine 28 to generate exhaust gas.

Moreover, in certain embodiments, the first turbine 28 may be operationally associated with a first generator 44 and a heat recovery steam generator (HRSG) 46. The first turbine 28 drives the first generator 44 to generate electricity. Further, the HRSG 46 receives the exhaust gas from the first turbine 28. As depicted in the presently contemplated configuration, the HRSG 46 may receive a condensed fluid from the condenser 54 via line 52. The condensed fluid, for example, may include water or organic fluids, such as, hydrocarbons or fluorinated hydrocarbons. The condensed fluid may be heated by the HRSG 46 using the exhaust gas received from the first turbine 28 to generate vapor and/or a heated working fluid. The vapor generated by the HRSG 46, for example, may include high pressure vapor, intermediate pressure vapor, low pressure vapor, or combinations thereof. Further, in one embodiment, the vapor generated by the HRSG 46 is superheated vapor. Also, as shown in the presently contemplated configuration, the HRSG 46 may transfer the heated working fluid to the solar evaporator/superheater 22 via line 50. In one embodiment, the heated working fluid may be transferred as vapor and/or liquid to the solar evaporator/superheater 22 via line 50. Furthermore, in one embodiment, the heated working fluid is transferred to the solar evaporator/superheater 22 to facilitate generation of solar vapor. As used herein, the term "solar vapor" may be used to refer to vapor that is generated using solar energy or using the second portion of the heated solar fluid.

Furthermore, the solar evaporator/superheater 22 may include a high pressure solar evaporator/superheater, an intermediate pressure solar evaporator/superheater, a low pressure solar evaporator/superheater, or combinations thereof. Accordingly, the low pressure solar evaporator/superheater may generate a low pressure solar vapor, while the high pressure solar evaporator/superheater may generate a high pressure solar vapor. Similarly, the intermediate pressure solar evaporator/superheater may generate an intermediate pressure solar vapor. It may be noted that while in the presently contemplated configuration, the system 10 includes a solar evaporator/superheater, in certain other embodiments, the system 10 may include solar evaporators, solar boilers, solar superheaters, solar economizers, solar reheaters, or combinations thereof.

Moreover, the solar evaporator/superheater 22 may heat and evaporate the heated working fluid using the second portion of the heated solar fluid to generate the solar vapor. The solar vapor, for example, may be a high pressure solar vapor, a low pressure solar vapor an intermediate pressure solar vapor. It may be noted that while in the presently contemplated configuration, the system 10 is depicted as including a single solar evaporator/superheater 22, in certain other embodiments, the system 10 may include multiple solar evaporators/superheaters.

In one embodiment, the heating and evaporation of the heated working fluid received from the HSRG 46 using the second portion of the heated solar fluid from the solar field and receivers 12 may result in cooling of the second portion of the heated solar fluid, thereby resulting in the cooled solar fluid. Subsequently, this cooled solar fluid is transferred from the solar evaporator/superheater 22 to the solar field and receivers 12 via line 56. The cooled solar fluid is then used by the solar field and receivers 12 to absorb heat of the sunrays to generate the heated solar fluid.

Furthermore, as depicted in FIG. 1, the solar vapor generated by the solar evaporator/superheater 22 and the vapor generated by the HRSG 46 may be transferred to a second turbine 58 via line 60. In one embodiment, the vapor may include high pressure vapor, low pressure vapor, or both. In one embodiment, the second turbine 58 is a steam turbine. The solar vapor generated by the solar evaporator/superheater 22 and the vapor generated by the HRSG 46 may then be used by the second turbine 58 to drive a second generator 62 that generates electricity. It should be noted, that while in the presently contemplated technique, the first turbine 28 drives the first generator 44, and the second turbine 58 drives the second generator 62, in certain other embodiments, the first turbine 28 and the second turbine 58 may drive a single generator.

Figure 2:
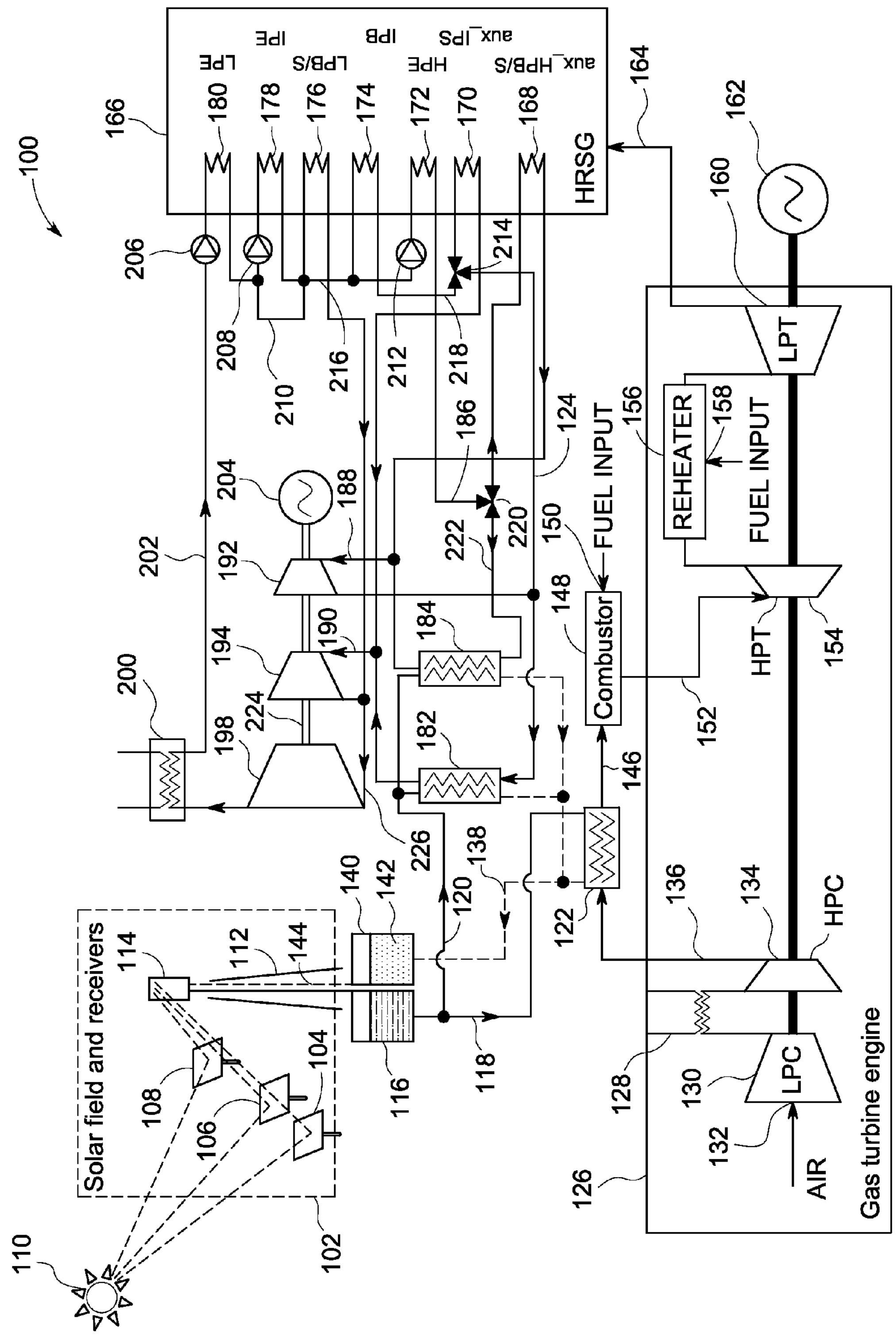
FIG. 2 is a diagrammatical view of another embodiment of an electricity generation system for generating electricity, in accordance with aspects of the present technique.

FIG. 2 is a diagrammatical view of another embodiment of an electricity generation system 100 for generating electricity, in accordance with aspects of the present technique. More particularly, FIG. 2 is a diagrammatical illustration of the electricity generation system 100 that generates electricity via use of a hybrid combined cycle with solar preheating. The electricity generation system 100 may include a solar field and receivers 102 for concentrating sunrays from the sun 110 and absorbing heat from the sunrays. In one embodiment, as depicted in FIG. 2, the solar field and receivers 102 may include a plurality of two-axis tracking mirrors 104, 106, 108, a tower 112 and a receiver 114, only three mirrors are illustrated for convenience. The plurality of two-axis tracking mirrors 104, 106, 108 may reorient themselves depending upon the direction of the sun 110 to concentrate maximum amount of sunrays received from the sun 110. It may be noted that, while the presently contemplated configuration depicts the solar field and receivers 102 as including three mirrors 104, 106, 108, in certain other embodiments, the mirrors in the solar field and receivers 102 may include less than or greater than three mirrors.

Furthermore, in one embodiment, the receiver 114 of the solar field and receivers 102 may be mounted on the top of the tower 112. As shown in FIG. 2, the sunrays concentrated by the plurality of two-axis tracking mirrors 104, 106, 108 may be reflected towards the receiver 114. In an alternative embodiment, a secondary mirror (not shown in FIG. 2) may be mounted on the top of the tower 112 and a ground receiver (not shown in FIG. 2) may be positioned on the ground. In such an embodiment, the secondary mirror may redirect the sunrays received from the plurality of two-axis tracking mirrors 104, 106, 108 towards the ground receiver. Further, it may be noted that while in the presently contemplated configuration, the solar field and receivers 102 includes the plurality of two-axis tracking mirrors 104, 106, 108, in certain embodiments, the solar field and receivers 102 may instead include a parabolic trough, dish concentrating Fresnel reflectors, and the like.

Moreover, the receiver 114 may include a solar fluid to absorb a substantial amount of heat from the sunrays. As previously noted with reference to FIG. 1, the term "solar fluid" may be used to refer to a fluid that absorbs heat of the sunrays. The solar fluid, for example, may include a molten salt, a molten metal, an eutectic alloy, such as, Galinstan (68.5% Ga, 21.5% In, 10% Sn), a thermal oil, water, steam, or pressurized air. The absorption of heat by the solar fluid in the receiver 114 increases the temperature of the solar fluid resulting in a heated solar fluid. In one embodiment, the temperature of the heated solar fluid may be in a range from about 300° C. to about 1000° C.

Additionally, in one embodiment, the electricity generation system 100 may optionally include a heated solar fluid buffer tank 116 for storing the heated solar fluid received from the solar field and receivers 102. The heated solar fluid buffer tank 116 may receive the heated solar fluid from the receiver 114. The heated solar fluid buffer tank 116, for example, may supply the heated solar fluid during interrupted or reduced solar radiation and at night time, thereby prevents disruptions in the supply of the heated solar fluid to the electricity generation system 100 during non-sunny days or at night.

Moreover, as illustrated in the presently contemplated configuration, a first portion of the heated solar fluid from the heated solar fluid buffer tank 116 may be transferred to a solar preheater 122 via line 118. In one embodiment, the solar preheater 122 may be the solar preheater 18 (see FIG. 1). The solar preheater 122 may receive compressed discharge air via line 136 from a high pressure compressor (HPC) 134 in a gas turbine engine 126.

In accordance with further aspects of the invention, the gas turbine engine 126 may optionally also include a low pressure compressor (LPC) 130, and an intercooler 128 operationally coupled to the LPC 130 and the HPC 134. The LPC 130 may compress air received from an inlet 132 thereby generating compressed air. The compression of the air results in an increase in temperature of the compressed air. Subsequently the compressed air may be cooled by the intercooler 128 to generate cool compressed air. The cool compressed air may be further compressed by the HPC 134 to generate the compressed discharge air. In one embodiment, the temperature of the compressed discharge air may be in a range from about 300° C. to about 500° C. It may be noted that the optional inclusion of the intercooler 128 may lead to a higher efficiency of the electricity generation system 100 and low temperature of the compressed discharge air. Also, in one embodiment, when the LPC 130 and the intercooler 128 are not included in the gas turbine engine 126, the air may be compressed by the HPC 134 alone to generate the compressed discharge air.

Furthermore, in one embodiment, the solar preheater 122 may include a heat exchanger that transfers the heat of the first portion of the heated solar fluid received from the heated solar fluid buffer tank 116 to the compressed discharge air received from the HPC 134 via line 136. The transfer of the heat of the first portion of the heated solar fluid to the compressed discharge air increases the temperature of the compressed discharge air and decreases the temperature of the first portion of the heated solar fluid. Consequent to the decrease in temperature of the first portion of the heated solar fluid within the solar preheater 122, cooled solar fluid may be generated. The cooled solar fluid may then be transferred from the solar preheater 122 to a cold buffer tank 140 via line 138. As shown in FIG. 2, the cooled solar fluid 142 may be stored in the cold buffer tank 140. Further, the cooled solar fluid 142 may be transferred from the cold buffer tank 140 to the receiver 114 via line 144. It may be noted that, while in the presently contemplated configuration, the solar field and receivers 102 include the heated solar fluid buffer tank 116 for storing heated solar fluid and the cold buffer tank 140 for storing cooled solar fluid, in certain embodiments, a single tank may be used to pump or store the heated solar fluid and the cooled solar fluid.

Similarly, subsequent to the increase in the temperature of the compressed discharge air within the solar preheater 122, heated compressed air may be generated. As previously noted, the temperature of the heated compressed air may be in a range from about 700° C. to about 1000° C. Further, in one embodiment, the temperature of the heated compressed air may be substantially similar to the first portion of the heated solar fluid.

With continuing reference to FIG. 2, the system 100 may include a combustor 148 that is operationally coupled to the solar preheater 122. The combustor 148 receives the heated compressed air from the solar preheater 122 via line 146. In one embodiment, the combustor 148 combusts a fuel received from an inlet 150 using the heated compressed air to generate hot burned gas. In certain embodiments, the temperature of the hot burned gas may be in a range from about 1200° C. to about 1500° C.

Furthermore, the hot burned gas may be transferred to a high pressure turbine (HPT) 154 in the gas turbine engine 126 via line 152. In one embodiment, the HPT 154 may be the first turbine 28 (see FIG. 1). The hot burned gas may then expand in the HPT 154 leading to generation of a first expanded gas. As shown in the presently contemplated configuration, the HPT 154 may be operationally coupled to a reheater 156. In one embodiment, the reheater 156 may receive fuel from an inlet 158. The reheater 156 may combust the fuel received from the inlet 158 using the first expanded gas to generate a heated first expanded gas. The heated first expanded gas is then expanded in a low pressure turbine LPT 160 to generate an exhaust gas. Also, as shown in FIG. 2, the system 100 may include a first generator 162 operationally associated with the LPT 160.

Furthermore, as shown in the presently contemplated configuration, the exhaust gas may be transferred to a heat recovery steam generator (HRSG) 166 from the LPT 160 via line 164. In one embodiment, the HRSG 166 generates a heated working fluid using the exhaust gas. The HRSG 166 may optionally include one or more of an auxiliary high pressure boiler/superheater (aux_HPB/S) 168, an auxiliary intermediate pressure superheater (aux_IPS) 170, a high pressure evaporator (HPE) 172, an intermediate pressure boiler (IPB) 174, a low pressure boiler/superheater (LPB/S) 176, an intermediate pressure evaporator (IPE) 178, and a low pressure evaporator (LPE) 180 to generate vapor at different pressure levels.

In addition, as depicted in FIG. 2, the HRSG 166 may be operatively coupled to a condenser 200. The condenser 200 condenses a fluid to generate a condensed fluid that is then transferred to the HRSG 166. As illustrated in FIG. 2, the condenser 200 condenses a fluid received from a low pressure turbine (LPT) 198 to generate the condensed fluid. As used herein, the term "condensed fluid" may be used to refer to a fluid that may be used to generate vapor. The condensed fluid, for example, may include water or organic fluids, such as, hydrocarbons suitable for use in a Rankine cycle. Furthermore, in one embodiment, the condenser 200 may transfer the condensed fluid to the LPE 180 in the HRSG 166 via line 202. The condenser 200 may pump the condensed fluid to the LPE 180 at a desired pressure via a pump 206. In one embodiment, the LPE 180 may generate low pressure vapor and/or low pressure heated fluid by heating the condensed fluid using the heat of the exhaust gas. In one embodiment, the pressure of the low pressure vapor and/or the low pressure heated fluid may be about 4.5 bar. Also in certain embodiments, the temperature of the low pressure vapor or the low pressure heated fluid may be about 320° C.

Furthermore, as shown in FIG. 2, the LPE 180 may then transfer the low pressure vapor and/or the low pressure heated fluid to the IPE 178 and the LPB/S 176 via line 210. As depicted in FIG. 2, the LPE 180 may pump the low pressure vapor and/or the low pressure heated fluid to the IPE 178 via a pump 208. Thus, the IPE 178 may generate intermediate pressure fluid by heating the low pressure vapor and/or the low pressure heated fluid using the heat of the exhaust gas. Similarly, in one embodiment, the LPB/S 176 may generate a low pressure vapor. The pressure of the intermediate pressure vapor generated by the IPE 178, for example, may be about 35 bar. Further, the temperature of the intermediate pressure fluid generated by the IPE 178 may be about 620° C. In one embodiment, the pressure of the low pressure vapor generated by the LPB/S 176 may be about 4.5 bar. In another embodiment, the temperature of the low pressure vapor generated by the LPB/S 176 may be about 320° C.

Moreover, the IPE 178 may further transfer the intermediate pressure fluid to the LPB/S 176, the IPB 174 and the HPE 172 via line 216. The IPB 174 may generate intermediate pressure vapor. In one embodiment, the intermediate pressure vapor may be transferred at a desired pressure to the HPE 172 via a pump 212. In one embodiment, the HPE 172 may generate high pressure fluid by heating the intermediate pressure fluid.

In addition, the aux_IPS 170 may receive the intermediate pressure vapor from the IPB 174 via line 218. In one embodiment, the IPB 174 may transfer the intermediate pressure vapor to a solar intermediate pressure reheater/superheater SIPR/S 182 via a three way valve 214 via line 124. As described in later parts of this description, the SIPR/S 182, for example, may generate superheated intermediate pressure solar vapor by heating the intermediate pressure vapor using the heat of a second portion of the heated solar fluid. Further, the IPB 174 may alternatively transfer the intermediate pressure vapor to the aux_IPS 170 via the three way valve 214. The aux_IPS 170 may generate superheated intermediate pressure vapor. The pressure of the superheated intermediate pressure vapor may be about 35 bar. Further, the temperature of the superheated intermediate pressure vapor may be about 620° C.

Furthermore, as depicted in FIG. 2, a three way valve 220 may be used by the HPE 172 to transfer the high pressure fluid to the aux_HPB/S 168 and a solar high pressure evaporator/superheater (SHPB/S) 184. As shown in FIG. 2, the HPE 172 may use line 186 to transfer the high pressure fluid to the three way valve 220. Further, the high pressure vapor may be transferred to the SHPB/S 184 from the three way valve 220 via line 222. In one embodiment, the aux_HPB/S 168 may generate superheated vapor with a pressure of about 180 bar and a temperature of about 620° C.

Further, as previously noted, the SIPR/S 182 and the SHPB/S 184 may receive the intermediate pressure vapor from the IPB 174 and the high pressure fluid from the HPE 172, respectively. As depicted in FIG. 2, the SIPR/S 182 and the SHPB/S 184 may also receive a second portion of the heated solar fluid from the solar fluid buffer tank 116 via line 120. The SHPB/S 184 may generate superheated high pressure solar vapor by heating the high pressure fluid using the second portion of the heated solar fluid. Similarly, SIPR/S 182 may generate the superheated intermediate pressure solar vapor by heating the intermediate pressure vapor using the second portion of the heated solar fluid. As used herein, the term "high pressure solar vapor" may be used to refer to high pressure vapor that may be generated using solar energy. Similarly, as used herein, the term "intermediate pressure solar vapor" may be used to refer to intermediate pressure vapor that may be generated using solar energy.

Additionally, in certain embodiments, the superheated high pressure solar vapor generated by the SHPB/S 184 and the superheated vapor generated by the aux_HPB/S 168 in the HRSG 166 may be transferred to a high pressure turbine (HPT) 192 via line 188. The superheated high pressure solar vapor and the superheated vapor may be used by the HPT 192 to drive a second generator 204. In one embodiment, the second generator 204 may be the second generator 62 (see FIG. 1). Similarly, the superheated intermediate pressure solar vapor generated by the SIPR/S 182 and the intermediate pressure vapor generated by the aux_IPS 170 may be transferred to an intermediate pressure turbine (IPT) 194 via line 190. Furthermore, the low pressure vapor generated by the LPB/S 176 may be received by the low pressure turbine (LPT) 198 via line 226. In addition, as shown in the presently contemplated configuration, the LPT 198, the IPT 194 and the LPT 192 are mounted on a shaft 224 used to drive the second generator 204.

Figure 3:
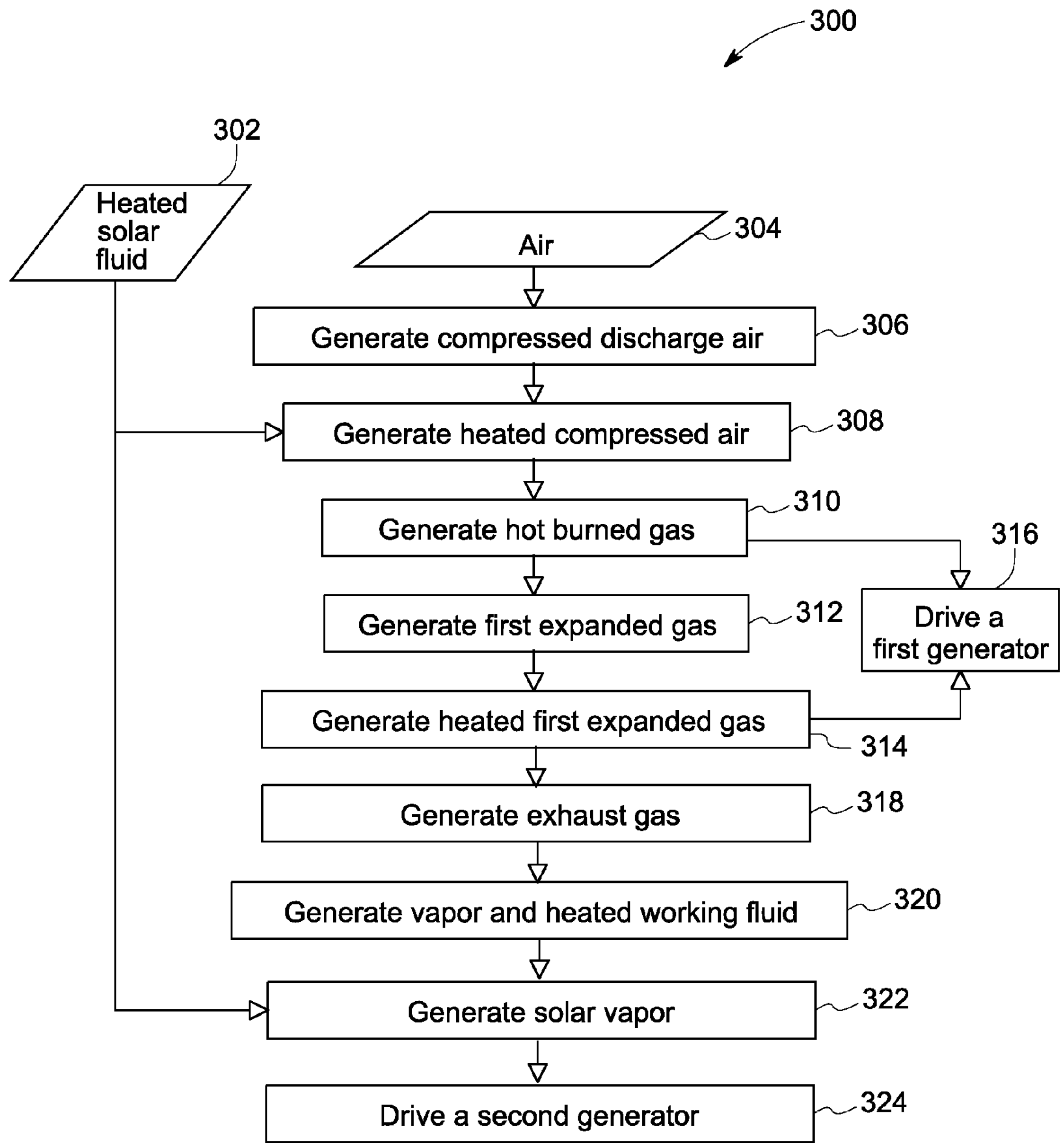
FIG. 3 is a flow chart illustrating an exemplary process of generating electricity, in accordance with aspects of the present technique.

FIG. 3 is a flow chart 300 illustrating an exemplary process of generating electricity, in accordance with aspects of the present technique. As depicted by FIG. 2, reference numeral 302 may be representative of a heated solar fluid and reference numeral 304 may be representative of air. As previously noted with reference to FIG. 1 and FIG. 2, the heated solar fluid 302 may be generated by heating a solar fluid in a solar field and receivers. Further, compressed discharge air may be generated at step 306 by compressing the air 304. The air 304, for example, may be compressed by a compressor. Further, at step 308, the compressed discharge air may be heated to generate heated compressed air. As previously noted with reference to FIG. 1 and FIG. 2, the compressed discharge air may be heated in a solar preheater or a solar heat exchanger. The solar preheater or the solar heat exchanger typically utilizes a first portion of the heated solar fluid 302 to heat the compressed discharge air.

Furthermore, at step 310, hot burned gas may be generated by combusting the heated compressed air in a combustor. The hot burned gas is expanded in a high pressure turbine to generate a first expanded gas at step 312. The first expanded gas is then combusted in a reheater using a fuel to generate a heated first expanded gas 314. The first heated expanded gas is then expanded in a low pressure turbine to generate an exhaust gas 318. As shown in FIG. 3, in one embodiment, the hot burned gas and the heated first expanded gas may be used to drive a first generator at step 316. Further, in another embodiment, the first expanded gas and the exhaust gas may be used to drive the first generator at step 316.

With continuing reference to FIG. 3, vapor and heated working fluid is generated 320. The vapor, for example, may include superheated vapor. As previously noted with reference to FIG. 1 and FIG. 2, the heated working fluid and the vapor may be generated by a heat recovery steam generator. The heated working fluid, a portion of the vapor, and a second portion of the heated solar fluid may be used to generate solar vapor 322. The solar vapor, for example, may be generated by solar superheaters, solar evaporators, solar reheaters, solar boilers, or combinations thereof. Further, a second generator may be driven 324.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electricity generation system, comprising:

a solar preheater for preheating compressed discharge air using a first portion of a heated solar fluid to generate heated compressed air;

a combustor operatively coupled to the solar preheater to generate hot burned gas by burning a fuel using the heated compressed air:

a first turbine operatively coupled to the combustor to generate exhaust gas by expanding the hot burned gas:

a heat recovery steam generator coupled to the first turbine, the heat recovery steam generator comprising:

a low pressure evaporator that generates low pressure heated fluid by heating a condensed fluid using the heat of the exhaust gas;

an intermediate pressure evaporator and an intermediate pressure boiler that:

generate intermediate pressure fluid/vapor by heating the low pressure fluid using the exhaust gas and a pump;

transfer the intermediate pressure fluid to an auxiliary intermediate pressure boiler/superheater or a solar intermediate pressure evaporator/superheater, or combinations thereof, wherein said solar intermediate pressure evaporator/superheater generates a superheated intermediate pressure solar vapor using a part of a second portion of the heated solar fluid and the intermediate pressure fluid.

2. The system of claim 1, further comprising a solar field and receivers to concentrate sunrays and heat a solar fluid to generate the heated solar fluid.

3. The system of claim 2, wherein the solar preheater is operationally coupled to the solar field and receivers to receive the first portion of the heated solar fluid.

4. The system of claim 2, wherein the solar evaporator/superheater is operationally coupled to the solar field and receivers to receive the second portion of the heated solar fluid.

5. The system of claim 1, wherein the solar preheater is operationally associated with a compressor to receive the compressed discharge air from the compressor.

6. The system of claim 5, wherein the compressor comprises:

a low pressure compressor to:

receive air from an inlet;

compress air at a desired pressure level to generate compressed air;

an intercooler operationally coupled to the low pressure compressor and configured to:

receive the compressed air from the low pressure compressor, cool the compressed air to generate a cool compressed air;

a high pressure compressor operationally coupled to the intercooler to:

receive the cool compressed air from the intercooler;

compress the cool compressed air to generate the compressed discharge air.

7. The system of claim 1, wherein the first turbine comprises:

a high pressure turbine operatively coupled to the combustor to:

receive the hot burned gas from the combustor;

expand the hot burned gas to generate a first expanded gas;

a reheater operatively coupled to the high pressure turbine to:

receive the first expanded gas from the high pressure turbine;

combust a fuel using the first expanded gas to generate a first heated expanded gas; and a low pressure turbine operatively coupled to the high pressure turbine and the reheater, and configured to expand the first heated expanded gas received from the reheater to generate the exhaust gas.

8. The system of claim 1, further comprising a condenser to generate the condensed fluid.

9. The system of claim 1, further comprising a first generator operatively associated with the first turbine to generate electricity.

10. The system of claim 1, further comprising a second generator operatively associated with the second turbine to generate electricity.

11. The system of claim 1, further comprising a generator operatively associated with the first turbine and the second turbine to generate electricity.

12. The system of claim 11, further comprising a shaft coupled to the first turbine, the second turbine and the generator to generate electricity.

13. The system of claim 1, wherein the intermediate pressure boiler is coupled to the solar intermediate pressure reheater/superheater via a three way valve, and the high pressure evaporator/superheater is coupled to the solar high pressure evaporator/superheater via another three way valve.

14. The system of claim 1, wherein the intermediate pressure evaporator and the intermediate pressure boiler transfer the intermediate pressure fluid to the auxiliary intermediate pressure boiler/superheater or the solar intermediate pressure evaporator/superheater, or combinations thereof based upon an availability of heat from the heated solar fluid and availability of heat in the heat recovery steam generator.

15. The system of claim 1, further comprising:

a high pressure evaporator/superheater that:

generates high pressure vapor using the intermediate pressure fluid and a pump;

transfers the high pressure vapor to a solar high pressure reheater/superheater or an auxiliary high pressure superheater; and the solar high pressure reheater/superheater that generate superheated high pressure solar vapor using another part of the second portion of the heated solar fluid and the high pressure vapor.

16. The system of claim 15, wherein the high pressure evaporator/superheater transfers the high pressure vapor to the solar high pressure reheater/superheater or the auxiliary high pressure superheater based upon an availability of heat from the heated solar fluid and availability of heat in the heat recovery steam generator.

17. The system of claim 15, further comprising a second turbine configured to drive a second generator using the superheated intermediate pressure solar vapor, the superheated high pressure solar vapor and vapor received from the heat recovery steam generator.

* * * * *